United States Patent
Banerji et al.

(10) Patent No.: US 12,152,705 B2
(45) Date of Patent: *Nov. 26, 2024

(54) AUTOMOTIVE FUEL AND VAPOR TRANSPORT TUBING WITH MONOLAYER OR MULTILAYER STRUCTURE INCORPORATING GRAPHENE

(71) Applicant: Martinrea International US Inc., Auburn Hills, MI (US)

(72) Inventors: Anindya Banerji, Windsor (CA); Richmond Hahn, Auburn Hills, MI (US); Cory Doble, Ortonville, MI (US)

(73) Assignee: Martinrea International US Inc., Auburn Hills, MI (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/552,379

(22) Filed: Dec. 16, 2021

(65) Prior Publication Data

US 2022/0196188 A1 Jun. 23, 2022

Related U.S. Application Data

(60) Provisional application No. 63/127,567, filed on Dec. 18, 2020.

(51) Int. Cl.
*F16L 11/08* (2006.01)
(52) U.S. Cl.
CPC .................................. *F16L 11/085* (2013.01)
(58) Field of Classification Search
CPC .................................................... F16L 11/085
See application file for complete search history.

(56) References Cited

U.S. PATENT DOCUMENTS

| | | |
|---|---|---|
| 5,038,833 A | 8/1991 | Brunnnhofer |
| 5,076,329 A | 12/1991 | Brunnhofer |
| 5,611,373 A | 3/1997 | Ashcraft |
| 6,321,795 B1 | 11/2001 | Noone et al. |
| 6,555,243 B2 | 4/2003 | Flepp et al. |
| 6,615,877 B2 | 9/2003 | Zimmer et al. |
| 7,052,751 B2 | 5/2006 | Smith et al. |
| 7,063,873 B2 | 6/2006 | Bellet et al. |
| 8,273,432 B2 | 9/2012 | Mizutani et al. |

(Continued)

FOREIGN PATENT DOCUMENTS

WO 2014-168979 A1 10/2014

OTHER PUBLICATIONS

International Search Report and Written Opinion for Appln. No. PCT/US2021/063694 mailed Apr. 12, 2022, 9 pages.

*Primary Examiner* — David R Deal
(74) *Attorney, Agent, or Firm* — Dinmore & Shohl LLP

(57) ABSTRACT

A fluid transport tube and method for forming including either of a monolayer or multiple layers and having a polymer or copolymer which is formed into a circular cross sectional profile and with a Graphene material included in the layer. The Graphene material further includes any graphene derivative not limited to single layer Graphene, few layered Graphene, Graphene oxide and reduced Graphene oxide. Versions of the tube can further include inner and outer layers, between which at least one barrier layer is provided. Any of a polyamide 12 (PA 12) or polyamide 612 (PA 612) can be incorporated into the layer for increased environmental barrier resistance.

22 Claims, 8 Drawing Sheets

(56) References Cited

U.S. PATENT DOCUMENTS

| | | |
|---|---|---|
| 8,309,193 B2 | 11/2012 | Emad et al. |
| 8,807,173 B2 | 8/2014 | Lovett et al. |
| 9,163,754 B2 | 10/2015 | Yajima et al. |
| 9,592,648 B2 | 3/2017 | Harris et al. |
| 9,982,812 B2 | 5/2018 | Garver et al. |
| 2005/0131147 A1* | 6/2005 | Brule .................... B82Y 30/00 |
| | | 525/178 |
| 2007/0104907 A1 | 5/2007 | Nishioka et al. |
| 2008/0023094 A1 | 1/2008 | Sasai |
| 2008/0302437 A1 | 12/2008 | Lovett et al. |
| 2009/0314375 A1 | 12/2009 | Flat et al. |
| 2010/0009107 A1 | 1/2010 | Defilippi et al. |
| 2010/0062201 A1 | 3/2010 | Emad et al. |
| 2017/0074427 A1 | 3/2017 | Rosenberg et al. |
| 2019/0283375 A1 | 9/2019 | Ludlow |
| 2022/0186858 A1* | 6/2022 | Brandt .................... B32B 5/026 |

\* cited by examiner

AUTOMOTIVE FUEL AND VAPOR TRANSPORT TUBING WITH MONOLAYER OR MULTILAYER STRUCTURE INCORPORATING GRAPHENE

CROSS REFERENCE TO RELATED APPLICATIONS

The present application claims the priority of U.S. Ser. No. 63/127,567 filed Dec. 18, 2020.

FIELD OF THE INVENTION

The present invention discloses a flexible multi-layer automotive fluid transport tube and a related method of manufacturing. The variants of the tubing each include inner and outer most layers of a polyethylene or polyamide compounded with a graphene material. Intermediate layers can include any of additional layers of a bondable polyethylene, bondable polyamide (such as PA 612), or ethylene-vinyl alcohol copolymer.

Additional multi-layer variants contemplate an intermediate layer of a graphene plastic. The inner or outermost layers can further include either a single or multiple subset layers and can be constructed, without limitation, from any extruded polymer reinforced with the graphene powder. The polymer used may be any of a thermoplastic, thermoset, elastomer or other natural or synthetic polymers and may be chosen from, but not restricted to, any of a polypropylene, nylon 6, nylon-12, nylon-6,12, polyethylene, HDPE, terephthalate, polybutylene, polyvinyl fluoride, polyphthalamide, polyoxymethylene, polycarbonate, polyvinylchloride, polyester, and polyurethane.

DESCRIPTION OF THE BACKGROUND ART

Fluid transport tubing in vehicles perform the critical function of transporting different grades of fuel and their vapor, brake fluids, transmission oil and coolants during vehicle operation. Stringent government regulations related to increasing awareness of climate issues have led to demands of enhanced control of automotive fuel emissions. In the late 1980's, automotive suppliers in the United States began developing fuel lines with multiple layers in order to meet the CAFE and EPA requirements for reducing automotive hydrocarbon emissions.

In a typical multi-layer tube (MLT) construction, the outermost layer is chosen to meet the necessary mechanical properties of the tubing such as flexibility, impact strength, burst pressure etc. while the innermost layer is chosen for its chemical resistance and it also provides support to the rest of the laminating layers. Typically, the innermost layer maybe made of polyamide (PA 12) or polyethylene (PE). Fluororesins such as Polytetrafluoroethylene (PTFE) or Ethylene tetrafluoroethylene (ETFE) based barrier hoses dominated the fuel hose market especially when used for alcohol based fuel systems.

More recently, other materials have become more available. Ethylene-vinyl alcohol copolymer (EVOH) is a plastic resin that may act as an efficient barrier layer and may provide permeation resistance to multiple gases such as oxygen, hydrogen, as well as act as a barrier layer to hydrocarbon emissions. EVOH copolymers are most often used as a lamination between other thermoplastic film materials to control exposure to moisture. In some cases, separating tie layers with adhesion promoters may be inserted between the individual layers to ensure the cohesion of the laminate.

One of the drawbacks of multi-layer tubes includes the need to constantly re-engineer the various tube layers depending on the region of use and changing fuel systems across the world. To meet the different emission regulations in different places often additional barrier layers need to be added which in turn is neither the optimal economical or efficient solution.

As is also known, graphene is a two-dimensional planar nanomaterial comprising of $sp^2$ bonded carbon atoms packed in the honeycomb lattice. Many of the material properties, such as high tensile strength, high thermal and electrical conductivity, that makes graphene lucrative stems from the unique bonding structure of the planar graphene. However, the application of graphene at a macroscopic scale for applications as in the automotive industry continues to be a challenge.

Prior art references of note include each of U.S. Pat. No. 8,309,193, to Emad, and US 2017/0074427, to Rosenberg, which teach a multi-layer flexible tube with inner and outer most polyamide layers separated by each of adhesive and ethylene-vinyl alcohol copolymer (EVOH) layers. Zimmer, U.S. Pat. No. 6,615,877, teaches a similar multi-layer tubing with outer nylon, intermediate EVOH and inner nylon layers compounded with carbon black or graphite fibril.

SUMMARY OF THE PRESENT INVENTION

The present invention discloses a flexible single or multi-layer automotive fluid transport tube and a related method of manufacturing. The variants of the tubing each include inner and outer most layers of polyethylene or polyamide compounded with a graphene or graphene derivative material not limited to any of monolayer Graphene, few layered Graphene, Graphene Oxide, and reduced Graphene Oxide. In multi-layer variants, intermediate layers can include any of additional layers of a bondable polyethylene, bondable polyamide (such as PA 612), or ethylene-vinyl alcohol copolymer.

Additional multi-layer variants contemplate an intermediate layer of a graphene plastic. The inner or outermost layers can further include either a single or multiple subset layers and can be constructed, without limitation, from any extruded polymer reinforced with the graphene powder. The mechanical and environmental barrier resistance properties of the graphene polymer depends on the graphene loading to reflect an optimal amount of graphene added in order to achieve a desired environmental barrier resistance and mechanical properties (e.g. strength). Other features include incorporating any of a reinforcement braiding into one or more layers of the tubing, such also optionally including the use of any Graphene or Graphene derivative material compositions as previously described.

The polymer used may be any of a thermoplastic, thermoset, elastomer or other natural or synthetic polymers and may be chosen from, but not restricted to, any of a polypropylene, nylon 6, nylon-12, nylon-6,12, polyethylene, terephthalate, polybutylene, polyvinyl fluoride, polyphthalamide, polyoxymethylene, polycarbonate, polyvinylchloride, polyester, and polyurethane.

Accordingly, the present invention aims at incorporating Graphene in one or more polymer layers to improve barrier resistance properties and, in certain applications, to reduce the number of layers in a multi-layer (MLT) tube. The multi-layer tube may also be used in, but not restricted to, thermal management systems such as air-conditioning lines and oil cooling lines. In any application, the present invention describes use of graphene polymer composites to provide premium quality automotive industry scale fluid transport tubing with improved mechanical and barrier properties.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With non-limiting reference to the attached drawings the present invention teaches a multi-layer fluid and vapor transport, and which is not limited to automotive applications including fuel and brake lines. Other and additional envisioned applications can include thermal management systems, such as air conditioning and oil cooling lines, transmission oil cooling lines, suspension lines, air lines and coolant lines.

The present invention also teaches a related method of manufacturing any tube covered under the present system, article or assembly. In each variant disclosed, the tubing includes innermost and/or outermost coatings or layers of a formed (typically extruded) polymer or co-polymer material, this including but not limited to a polyethylene (PE) or polyamide (PA 12 or PA 612) which is with a Graphene or a Graphene derivative in powder or other form. Additional variants can include varying numbers of layers (such as two or more), with one or more intermediate layers also including a separating layer of a bondable polymer, and which may additionally be with Graphene or a Graphene derivative. Alternating with the polymer/copolymer layers is a suitable barrier layer, not limited to an ethylene-vinyl alcohol copolymer (EVOH), such providing enhanced barrier/environmental properties. For purposes of the present invention, the various layers are referenced generally and are understood to cover any range of coating thickness and are understood to represent preferred but non-limiting embodiments, it being envisioned that any suitable thickness ranges can be employed unless otherwise indicated.

Figure 1:
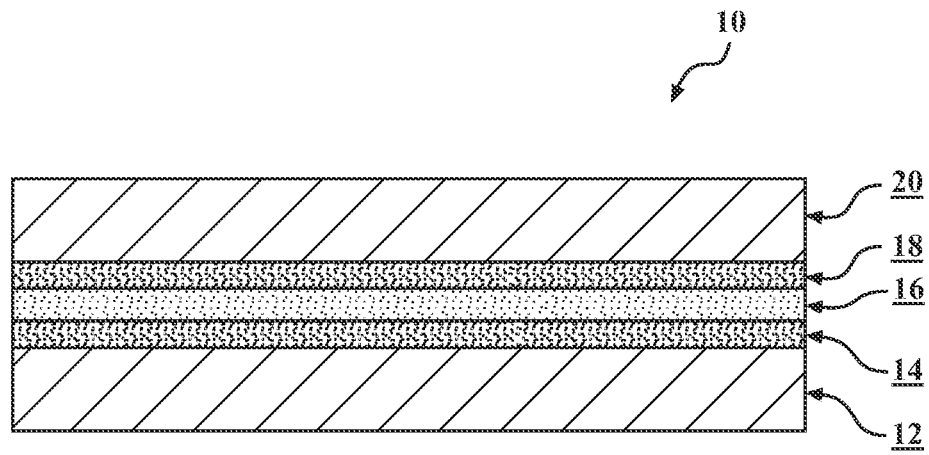
FIGS. 1 and 1A provide each of length cutaway and end cross sectional illustrations of a wall segment of an automotive fluid transport tube according to a first non-limiting embodiment and depicting a first layer of a polyethylene (PE) tubing with graphene or a Graphene derivative (PE+Gr) to provide environmental barrier resistance, a separating layer of a bondable PE, a barrier layer of an ethylene-vinyl alcohol copolymer (EVOH), a separating layer of a bondable PE and a fifth outermost layer of PE+Gr, such as which can also be with Graphene or an activated Graphene derivative in order to provide improved environmental barrier and abrasion resistance.
Figure 1A:
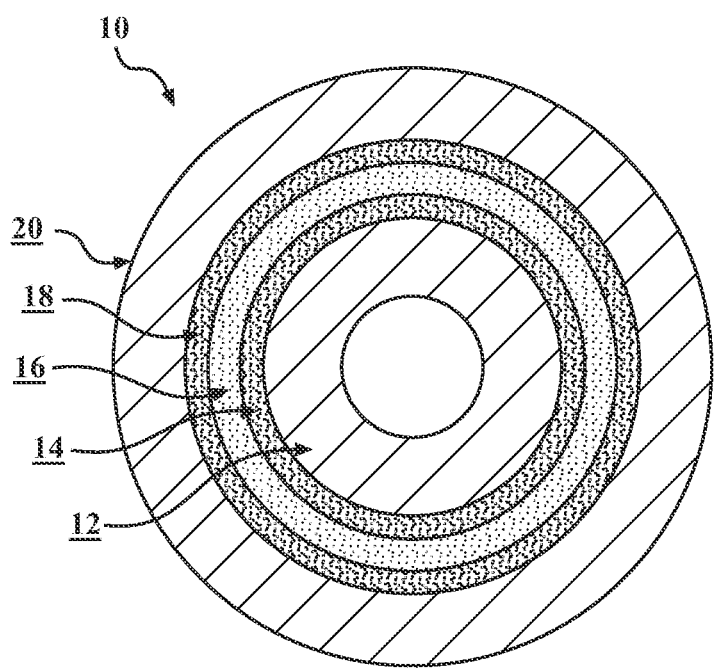

Referring initially to FIGS. 1 and 1A, a pair of length cutaway and cross sectional illustrations are generally shown at 10 of a wall segment of an automotive fluid transport tube according to a first non-limiting embodiment. The variant 10 of FIG. 1 includes a plurality of five layers and depicts a first layer 12 of an extruded (and optionally conductive) polymer material, such including but not limited to a polyethylene (PE) which can be with a Graphene or a Graphene derivative material according to any desired loading percentage by weight or volume. A second layer 14 of a bondable PE can be formed over the first layer 12. A third resin film layer 16, such as an ethylene vinyl alcohol copolymer (EVOH) material is applied over the second layer 14. A bondable PE 18 can be applied as a fourth separating layer, and over which a fifth cover layer 20 of a PE, which can be with Graphene or a Graphene derivative material (these including without limitation monolayer Graphene, few layered Graphene, Graphene oxide, and reduced Graphene oxide) is finally applied.

The layers 12-20 can be formed according to any desired process, not limited to successive extrusion operations using any suitable arrangement of cross head dies, controllers and the like. Without limitation, one or more of the layers of the multi-layer tube can be with Graphene or a Graphene derivative, such again provided in powder or other form and which can be mixed with the polymer/copolymer according to any desired percentage by weight or volume. This can include compounding graphene with the inner PE layer 12 as well as the outer PE layer 20 in order to increase barrier and abrasion resistance. In one further non-limiting range, the graphene material can be provided as a powder compounded with the polymer at a 0.01-60% (relative ratio or percentage) by weight.

The range of polymers or copolymers employed in the inner 12 and outer/top 20 coats or layers can further include any of thermoplastic, thermoset, elastomer or other natural or synthetic polymers, and may be chosen from, but not restricted to, any of a polypropylene, nylon 6, nylon-12, nylon-6,12, polyethylene, terephthalate, polybutylene, polyvinyl fluoride, polyphthalamide, polyoxymethylene, polycarbonate, polyvinylchloride, polyester, and polyurethane. It is further understood that this range of materials is applicable to the inner and outer extruded layers according to any of the related variants FIGS. 2-3 subsequently described.

Powdered multilayered graphene, such as which is fabricated by exfoliation techniques, is again compounded with either of the inner and outer layers by any range or percentage by weight loading. In each instance, the end goal is to provide superior properties to the inner/intermediate/outer layers of polymer or copolymer material produced, such that it exhibits improved mechanical properties, superior wear and anti-scratch resistance, as well as enhanced barrier resistance.

As is also known, Graphene is an atomic scale hexagonal lattice made of carbon atoms one atom layer in thickness. As is further known, graphene is a one-atom-thick planar sheet of sp2-bonded carbon atoms that are densely packed in a honeycomb crystal lattice. Graphene can be viewed as an atomic-scale chicken wire made of carbon atoms and their bonds. The name comes from GRAPHITE+-ENE, and in which graphite itself consists of many graphene sheets stacked together.

The carbon-carbon bond length in graphene is approximately 0.142 nm. Graphene is the basic structural element of some carbon allotropes including graphite, carbon nanotubes and fullerenes. It can also be considered as an infinitely large aromatic molecule, the limiting case of the family of flat polycyclic aromatic hydrocarbons called Graphenes. Measurements have shown that graphene has a breaking strength around 200 times greater than steel, making it the strongest material ever tested. Accordingly, and as supported by the present description, a Graphene powder combined with a variety of outer coating extruded polymers materials provides an environmental protective outer or top coat covering which provides superior environmental barrier and abrasion resistance.

Figure 2:
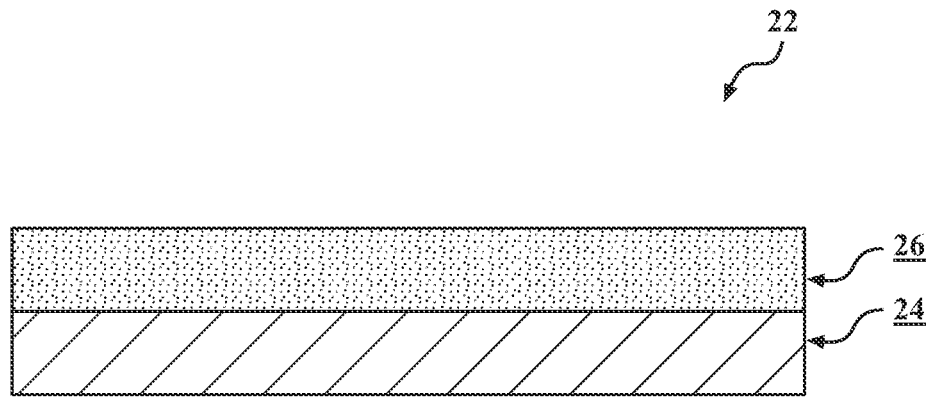
FIGS. 2 and 2A provide each of length cutaway and end cross sectional illustrations of a wall segment of a fuel and vapor transport tube according to a second non-limiting embodiment and depicting an inner (optionally conductive) layer and a cover layer, both of a polyethylene layer such as which can also be with Graphene or a Graphene derivative in order to provide improved environmental barrier and abrasion resistance.
Figure 2A:
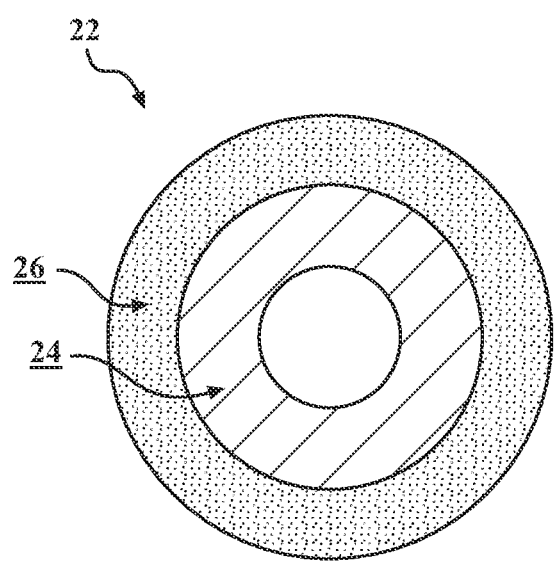

Referring to FIGS. 2 and 2A, provided are each of length cutaway and end cross sectional illustrations of a wall segment of an automotive fluid transport tube, generally at 22, according to a second non-limiting embodiment. An inner (optionally conductive) layer 24 and an outer or cover layer 26, both constructed from such as a polyethylene layer with Graphene, is provided in order to provide improved environmental barrier and abrasion resistance. As with the preceding embodiment, either or both layers of the multi-layer tube can be with graphene to provide increased barrier and abrasion resistance. The inner layer of PE 24 can also be conductive in given applications.

Figure 3:
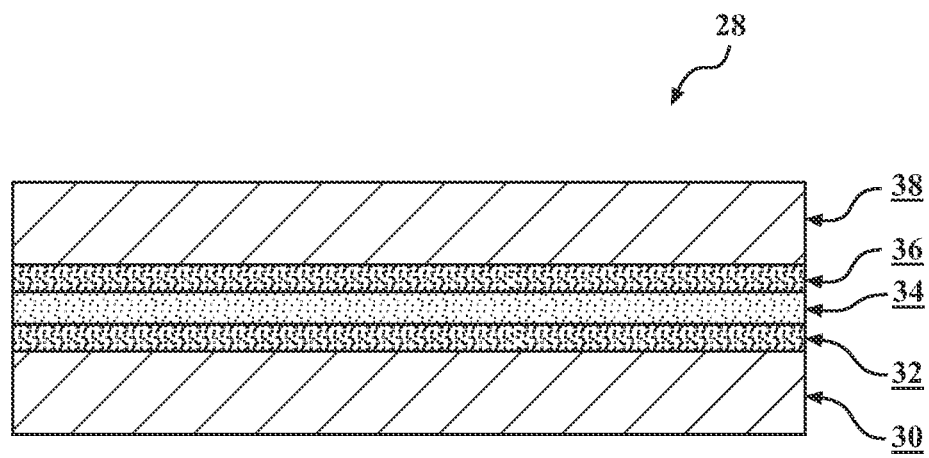
FIGS. 3 and 3A provide each of length cutaway and end cross sectional illustrations of a wall segment of an automotive fluid transport tube according to a third non-limiting embodiment and depicting a first innermost layer of a polyamide 12 (PA 12) or polyamide 612 (PA 612), either of which can be with Graphene or a Graphene derivative for increased environmental barrier resistance, a separating layer of a bondable polyamide 12 or polyamide 612, a barrier layer of ethylene-vinyl alcohol copolymer (EVOH), a further separating layer of a bondable polyamide 12 or polyamide 612, and an outer-most cover layer of a similar polyamide 16 or polyamide 612, with Graphene or a Graphene derivative in order to provide increased environmental barrier and abrasion resistance.
Figure 3A:
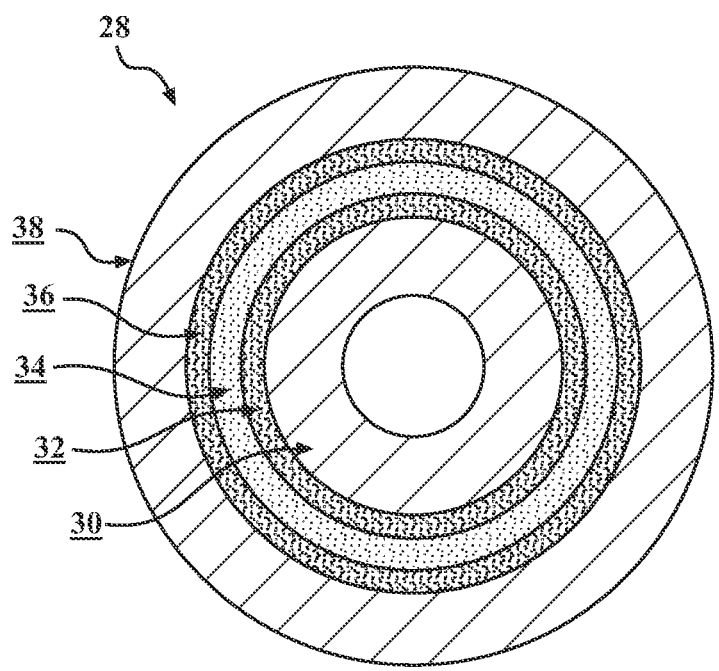

FIGS. 3 and 3A provide each of length cutaway and end cross sectional illustrations of a wall segment of an automotive fluid transport tube, see further generally at 28, according to a third non-limiting embodiment which draws similar parallels to that depicted at 10 in FIG. 1. The tube 28 depicts a first innermost layer 30 of a polyamide 12 (PA 12) or polyamide 612 (PA 612), either of which can be with Graphene or a Graphene derivative for increased environmental barrier resistance, over which is formed (such as in a successive extrusion operation) a separating layer 32 of a bondable polyamide 12 or polyamide 612. A barrier layer 34 of an ethylene-vinyl alcohol copolymer (EVOH) is subsequently applied, with a further separating layer 36 of a bondable polyamide 12 or polyamide 612. An outer-most cover layer 38 of a similar polyamide 16 or polyamide 612, such as compounded with Graphene, is then applied as a top coating in order to provide increased environmental barrier and abrasion resistance.

Figure 4:
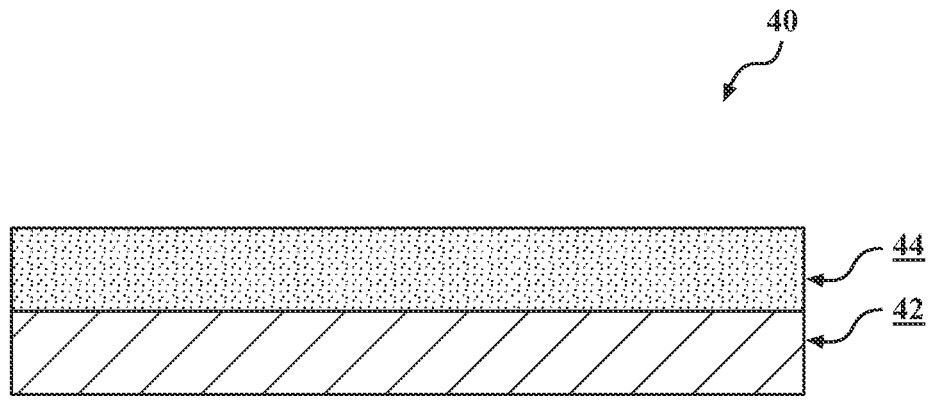
FIGS. 4 and 4A provide each of length cutaway and end cross sectional illustrations of a wall segment of an automotive fluid transport tube according to a fourth non-limiting embodiment and depicting both a first inner layer and a second outer layer of a polyamide 12 or polyamide 612, either or both with graphene or a Graphene derivative.
Figure 4A:
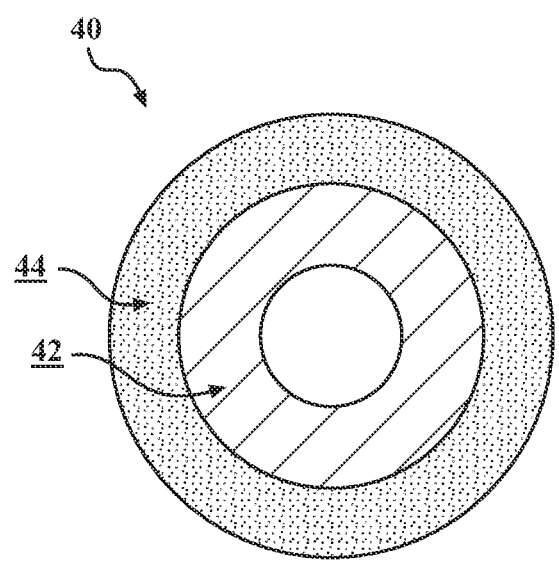

FIGS. 4 and 4A provide each of length cutaway and end cross sectional illustrations of a wall segment of an automotive fluid transport tube, generally at 40, according to a fourth non-limiting embodiment. The tube 40, similar to the prior embodiment 22 of FIG. 2, depicts a two layer arrangement with both a first inner layer 42 and a second outer layer 44 of a polyamide 12 or polyamide 612, either or both with Graphene or a Graphene derivative according to any loading percentage or weight.

Figure 5:
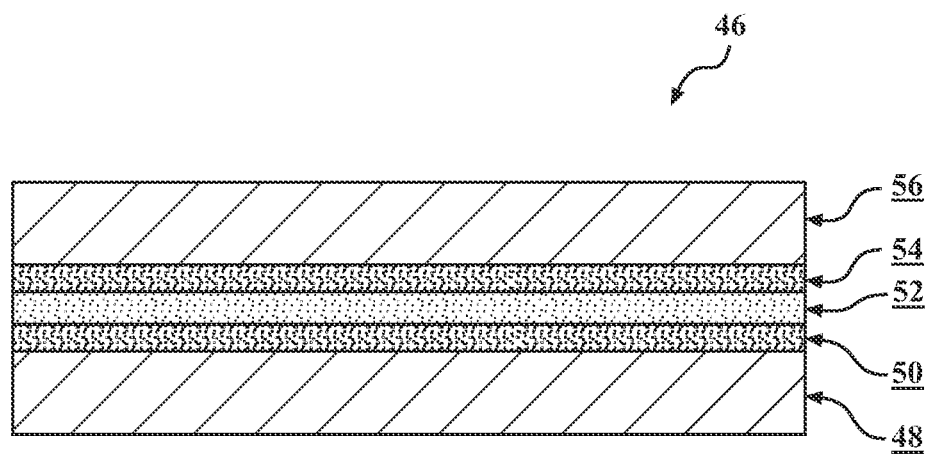
FIGS. 5 and 5A provide each of length cutaway and end cross sectional illustrations of a wall segment of an automotive fluid transport tube according to a fifth non-limiting embodiment and depicting a first innermost layer of a polyamide 612 (PA 612), which can be with graphene for increased environmental barrier resistance, a separating layer of a bondable polyamide 612, a barrier layer of ethylene-vinyl alcohol copolymer (EVOH) with Graphene, a further separating layer of a bondable polyamide 612, and an outer-most cover layer of a similar polyamide 612, with Graphene or a Graphene derivative in order to provide increased environmental barrier and abrasion resistance.
Figure 5A:
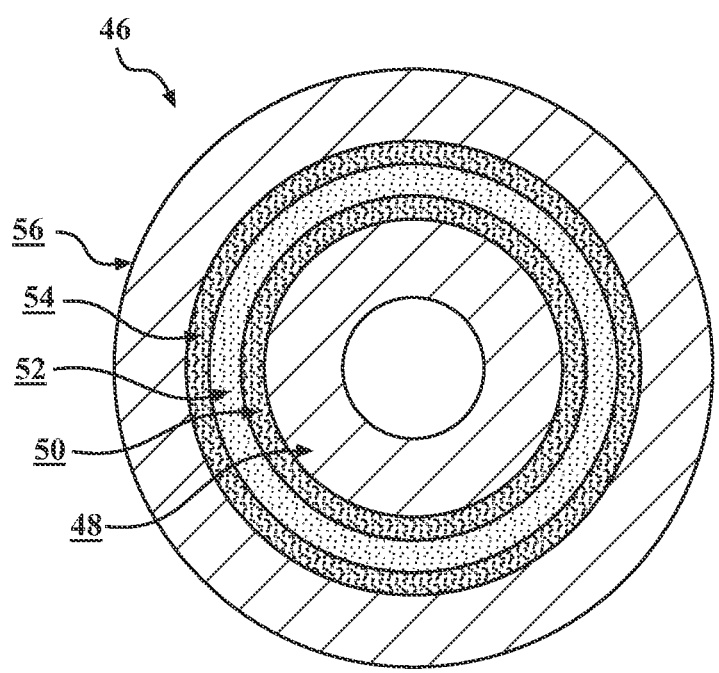

FIGS. 5 and 5A provide each of length cutaway and end cross sectional illustrations of a wall segment of an automotive fluid transport tube according to a fifth non-limiting embodiment 46 and depicting a first innermost layer of a polyamide 612 (PA 612) 48, which can be with Graphene or a Graphene derivative for increased environmental barrier resistance, a separating layer 50 of a bondable polyamide 612, a barrier layer 52 of ethylene-vinyl alcohol copolymer (EVOH) with a Graphene or a Graphene derivative for improved barrier performance, a further separating layer 54 of a bondable polyamide 612, and an outer-most cover layer 56 of a similar polyamide 612, with Graphene or a Graphene derivative in order to provide increased environmental barrier and abrasion resistance.

Figure 6:
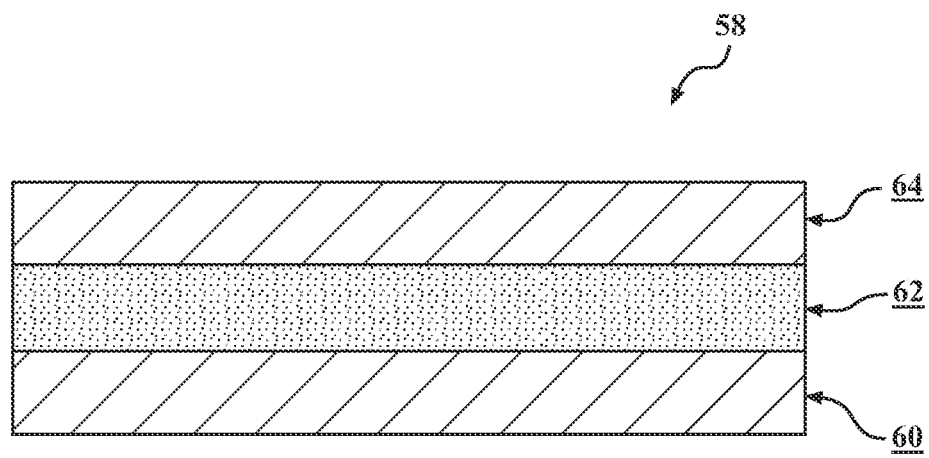
FIGS. 6 and 6A provide each of length cutaway and end cross sectional illustrations of a wall segment of an automotive fluid transport tube according to a sixth non-limiting embodiment and depicting a first innermost layer of a polyamide 612 (PA 612), a separating layer of a PA 612+Gr, and an outer cover layer of a PA 612.
Figure 6A:
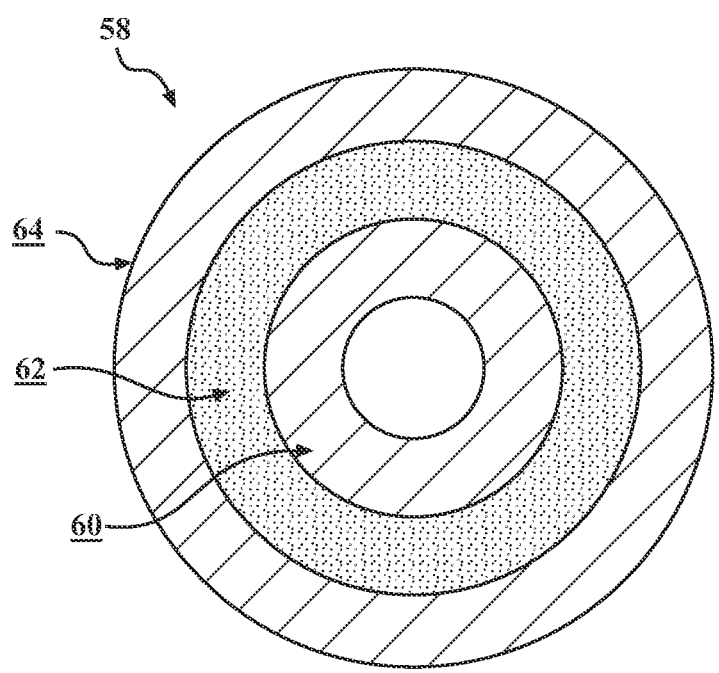

FIGS. 6 and 6A provide each of length cutaway and end cross sectional illustrations of a wall segment of an automotive fluid transport tube 58 according to a sixth non-limiting embodiment and depicting a first innermost layer 60 of a polyamide 612 (PA 612), a separating layer 62 of a PA 612 with Graphene or Graphene derivative which also acts as an environmental barrier and an outer cover layer 64 of a PA 612.

Figure 7:
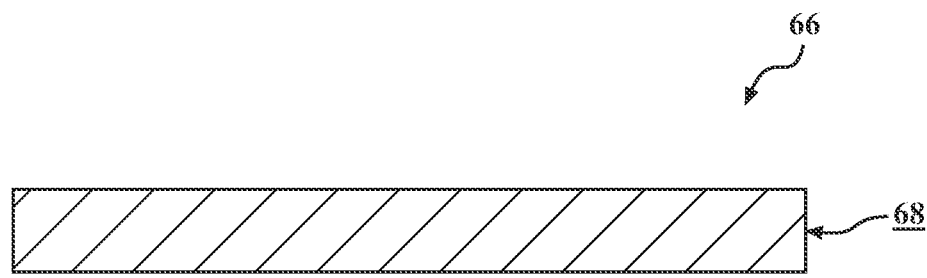
FIGS. 7 and 7A provide each of length cutaway and end cross sectional illustrations of a wall segment of an automotive fluid transport tube according to a seventh non-limiting embodiment and depicting a single layer of a polyamide 612 (PA 612), which can be with Graphene or a Graphene derivative in order to provide improved environmental barrier and abrasion resistance.
Figure 7A:
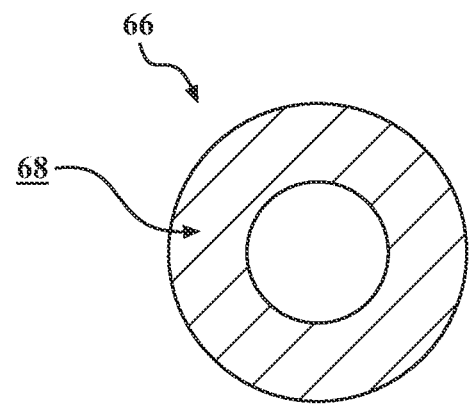

Proceeding to FIGS. 7 and 7A, illustrated at 66 are each of length cutaway and end cross sectional illustrations of a wall segment of an automotive fluid transport tube according to a seventh non-limiting embodiment. This version depicts a single layer 68 of a polyamide 612 (PA 612), which can be with Graphene or a Graphene derivative material not limited to any of monolayer graphene, few layered graphene, Graphene Oxide, and reduced Graphene Oxide. This is again provided in order to establish improved environmental barrier and abrasion resistance.

Figure 8:
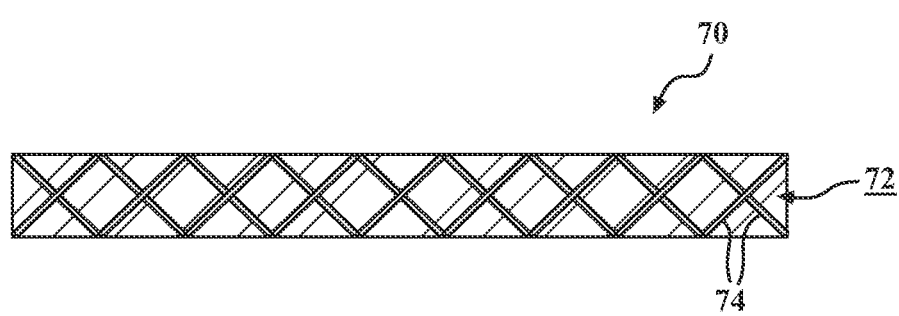
FIGS. 8 and 8A provide each of length cutaway and end cross sectional illustrations of a wall segment of an automotive fluid transport tube according to an eighth non-limiting embodiment and depicting a single monolayer which can be compounded with graphene or Graphene derivative and further incorporating a reinforcement braiding with Graphene or Graphene derivative in order to provide increased strength and abrasion resistance.
Figure 8A:
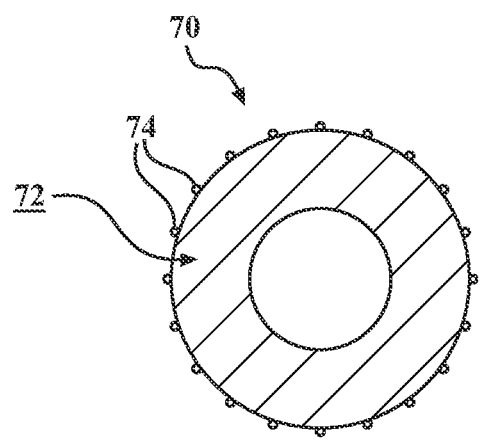

FIGS. 8 and 8A provide each of length cutaway and end cross sectional illustrations, see at 70, of a wall segment of an automotive fluid transport tube according to an eighth non-limiting embodiment and depicting a single monolayer 72 which can be with Graphene or a Graphene derivative material not limited to any of monolayer Graphene, few layered Graphene, Graphene Oxide, and reduced Graphene Oxide for improved environmental barrier and abrasion resistance as previously stated, and which is integrated into the monolayer tubing to provide additional strength.

The monolayer tubing can also incorporate a reinforcement braiding 74, such as which can also incorporate Graphene or Graphene derivative materials. Without limitation, the braiding pattern of the reinforcement can include arranging in any of a parallel or crosswise/diagonal directions. It is also envisioned that the braiding profiles can also extend in each of circumferential and axial directions within and along any of monolayer or multi-layer variants of the tube.

Figure 9:
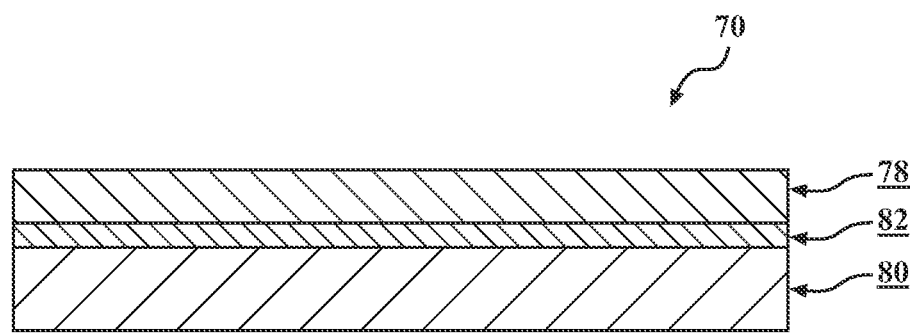
FIGS. 9 and 9A provide each of length cutaway and end cross sectional illustrations of a wall segment of an automotive fluid transport tube according to a ninth non-limiting embodiment which is a variant of the fourth non-limiting embodiment and which again depicts both the inner layer and further outer layer of a polyamide 12 or polyamide 612, either or both with Graphene or a Graphene derivative, in combination with an intermediate layer of a reinforcement with Graphene or a Graphene derivative in order to provide increased strength and abrasion resistance.
Figure 9A:
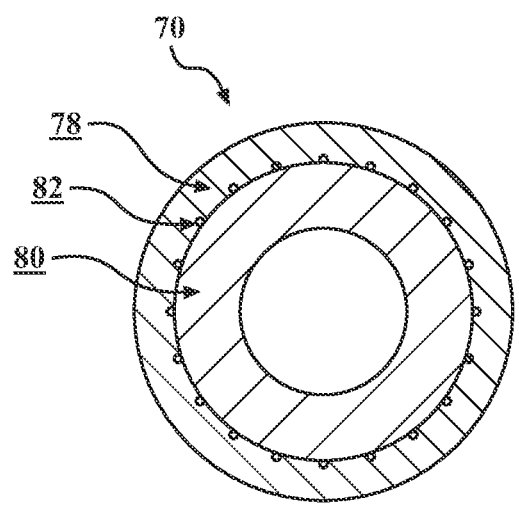

Finally, FIGS. 9 and 9A provide each of length cutaway and end cross sectional illustrations of a wall segment of a multilayer variant of fuel and vapor transport tube, see at 76, according to a ninth non-limiting embodiment, which is a related variant of the fourth non-limiting embodiment of FIGS. 4 and 4. Each of an inner layer 78 and further outer layer 80 of a polyamide 12 or polyamide 612 are again, either or both compounded with graphene, in combination with an intermediate layer 82 of a reinforcement with graphene in order to provide improved environmental strength and abrasion resistance. As previously described, the reinforcement elements can be provided according to any of a parallel or diagonal braided profiles and can be arranged both circumferentially and axially extending, without limitation at interface boundaries between specific layers.

Beyond the embodiments shown, it is understood that any combination of layers in a multi-layer tube can be provided and which include the incorporation of any type of film or other barrier layer, such as in order to provide customized operational characteristics which may be unique to a given application. This can again include providing such as a barrier layer of an EVOH material that may be with Graphene or a Graphene derivative material not limited to those previously described, providing an intermediate layer of polymer with Graphene or Graphene derivative or copolymer with Graphene (such as in the instance of a five layer or greater combination of MLT), as well as providing any of the polymer/copolymer layers with subset layers of any composition or graphene loading factor.

Having described my invention, other and additional preferred embodiments will become apparent to those skilled in the art to which it pertains, and without deviating from the scope of the appended claims. This can include substituting the extrusion line process for creating the tube with any other suitable forming operation, such as potentially a cavity mold having any type of die slide or pick and place technology for creating individual lengths of tubing having the desired material construction.

The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

We claim:

1. A fuel transport tube, comprising:
   inner and outer layers formed into a circular cross sectional profile;
   said inner layer constructed from a single ply including any of a polyamide or a polyethylene;
   said outer layer constructed of a polymer or copolymer;
   any of a barrier layer or film applied between said inner and outer layers;
   said barrier layer incorporating either of a Graphene material or a Graphene derivative material; and
   a Graphene material incorporated into at least said inner layer.

2. The tube according to claim 1, said Graphene material further comprising any Graphene derivative not limited to monolayer Graphene, few layered Graphene, Graphene oxide and reduced Graphene oxide.

3. The tube according to claim 1, said outer layer further comprising either of an extruded polyethylene or a polyamide.

4. The tube according to claim 1, said inner polyamide layer further comprising any of a polyamide 12 (PA 12) or polyamide 612 (PA 612) incorporated into said inner layer.

5. The tube according to claim 1, said barrier layer further comprising any of a polymer, a copolymer or an ethylene-vinyl alcohol copolymer.

6. The tube according to claim 1, said barrier layer further comprising a polymer or copolymer that may be compounded with graphene or graphene oxide.

7. The tube according to claim 1, further comprising said inner layer being conductive.

8. The tube according to claim 1, further comprising an intermediate polymer or copolymer layer between said inner and outer layers.

9. The tube according to claim 8, said intermediate layer further comprising a bondable polyethylene.

10. The tube according to claim 8, said intermediate layer further comprising a bendable polyamide.

11. The tube according to claim 1, said outer layer further comprising any of a thermoplastic, thermoset, elastomer or other natural or synthetic polymer, and can further include any of a polypropylene, nylon 6, nylon-12, nylon-6,12, polyethylene, terephthalate, polybutylene, polyvinyl fluoride, polyphthalamide, polyoxymethylene, polycarbonate, polyvinylchloride, polyester, and polyurethane.

12. The tube according to claim 1, further comprising said graphene material or a graphene derivative material being provided as a powder compounded with said polymer at 0.01-60% by weight.

13. The tube according to claim 1, further comprising a reinforcement braiding incorporated in or located above at least one of said inner and outer layers.

14. The tube according to claim 13, further comprising said reinforcement braiding incorporating said Graphene material or a Graphene derivative material.

15. A method for manufacturing a fluid or vapor transport tube, comprising the steps of:
   providing an inner layer constructed from a single ply including any of a polyamide or a polyethylene;
   providing an outer layer constructed of a polymer or copolymer;
   incorporating a graphene or graphene derivative into at least said inner layer;
   forming the inner and outer layers as circular cross sectional layers; and
   forming any of a barrier layer or film between the inner and outer layers incorporating the graphene or graphene derivative.

16. The method according to claim 15, further comprising the step of applying the barrier layer as forming with any of an ethylene-vinyl alcohol polymer, copolymer, EVOH, aramid, or fluoroplastic.

17. The method according to claim 15, further comprising the step of forming the inner layer from a conductive material.

18. The tube according to claim 15, further comprising the step of forming an intermediate polymer or copolymer layer between the inner and outer layers.

19. The method as described in claim 15, further comprising the step of the polymer, copolymer additionally including any of an aramid or fluoroplastic layer including any of a thermoplastic, thermoset, elastomer or other natural or synthetic polymer including any of a polyethylene, polyamide, polypropylene, nylon 6, nylon-12, nylon-6,12, terephthalate, polybutylene, polyvinyl fluoride, polyphthalamide, polyoxymethylene, polycarbonate, polyvinylchloride, polyester, and polyurethane.

20. The method as described in claim 15, said step of forming further comprising extruding the inner and outer circular cross sectional layers.

21. The method as described in claim 15, further comprising the step of a incorporating a reinforcement braiding in or above at least one of the inner and outer layers, the braiding further incorporating any of the graphene or graphene derivative.

22. The method as described in claim 15, further comprising the step of incorporating either of a polyamide 12 (PA 12) or polyamide 612 (PA 612) into the inner layer.

* * * * *